United States Patent [19]

Bozoyan

[11] Patent Number: 4,595,346
[45] Date of Patent: Jun. 17, 1986

[54] WATERLESS URINAL PUMPS

[76] Inventor: Edward Bozoyan, 1812 West St., Union City, N.J. 07087

[21] Appl. No.: 597,410

[22] Filed: Apr. 5, 1984

Related U.S. Application Data

[63] Continuation of Ser. No. 395,264, Jul. 6, 1982, abandoned.

[51] Int. Cl.⁴ .............. F04B 7/00; E03D 13/00; E03D 11/00
[52] U.S. Cl. .................. 417/513; 417/328; 4/431; 4/432; 4/435; 4/301
[58] Field of Search ............... 417/443–445, 417/510, 513, 511, 514, 520, 460, 469, 328, 470; 137/340; 4/431, 432, 434, 435, 436, 301, 144.1

[56] References Cited

U.S. PATENT DOCUMENTS

| 1,465,392 | 8/1923 | Goodfellow | 417/460 |
| 1,650,155 | 11/1927 | Randle | 4/458 |
| 2,211,823 | 8/1940 | Jepson | 251/340 |
| 2,368,568 | 1/1945 | Poulter | 417/511 |
| 3,254,607 | 6/1966 | Norton | 417/511 |

FOREIGN PATENT DOCUMENTS 407075 3/1934 United Kingdom ............... 417/460

*Primary Examiner*—William L. Freeh

[57] ABSTRACT

Two flanged sleeves, closed and valved at one end, and a bonnet with two gudgeons act as a cylinder-piston mechanism for pumping. The upper sleeve is movable and spring-loaded, accepts and is filled with liquid. When the bonnet is depressed, through its gudgeons, upper valve is closed, upper sleeve is pushed down, lower valve is constrained open, and the content is pumped into a discharge.

9 Claims, 6 Drawing Figures

WATERLESS URINAL PUMPS

The present application is a continuation of the application filed July 6, 1982, Ser. No. 395,264, Art Unit 243, now abandoned.

SUMMARY OF THE INVENTION

This invention relates to a reciprocating pump, and is particularly directed to water-saver urine receptacles for homes and all other places. The invention is also concerned with the provision of female urinals adapted to be readily used by females.

According to the present invention, as typical example, there is provided a small urinal pump comprising: (a) two closely fitting, flanged sleeve members, (b) both sleeve members having a closed circular upper face provided with a conversely positioned one-way valve, (c) a stepped bonnet having two gudgeons and being open at both ends, disposed about the outer sleeve member, (d) a helical compression spring holding up the outer sleeve member and the bonnet, (e) a slender and flexible intake line plumbed to upper valve chamber for supplying rinsing fluid and a similar discharge line plumbed one end to the bottom of lower valve and the other end to a toilet bowl trap or nearby drain or a tank.

When the upper sleeve is filled with urine or other foul liquid, the bonnet is depressed through its gudgeons, upper valve is closed at once, upper sleeve is pushed down with it, lower valve is constrained open under the above pressure, and the content is pumped into a flexible discharge line plumbed to a disposal means.

STATE-OF-THE-ART AND OBJECTS

Water is one of the most precious elements on earth but its consumption is sharply rising.

It has been reported that toilet bowls consume about 40% of the water used by people. Most toilets use 5½ gallons or more per flush. However, in private and apartment houses, in small business areas, these toilets are commonly used as a urinal. Urinating accounts for 36% of this usage and defecating for only 4%.

It is important object of the present invention, therefore, to provide a toilet auxiliary device which disposes of the urine with no water flush.

There is no urinal fixture in any country, at the present day, for females. It is accordingly another important object of the present invention to introduce a new female-type urinal with a saddlelike small seat, thereby resulting in saving a huge amount of water for each country along with other advantages.

Accordingly, the present invention is directed to a reciprocating pump with an open fluid entry into its pressure chamber for downwardly pouring liquids from the outside of the pump.

Urinals presently in use are large and bulky sinks, found only in restrooms, bathrooms and pissoirs. They have large and exposed openings and large-size plumbing.

A further object of this invention is to provide a waterless urinal of streamline design, floor-mounted, upright, small in diameter, lightweight and having slender, flexible lines for discharge and rinsing lines. Accordingly, to provide a portable urinal suitable for cruiser-buses, railroad cars, campers etc. Still another object is to provide a sanitary urinal which is snap-closed with a flip-cap after its use, thereby preventing spatter, spill, drip, odor, flies, air pollution and so on. Yet another object is to provide nearby urinal/cuspidors which, by virtue of their streamlined configuration, size and flexible plumbing, in conjunction with proper guard means, are suitable for unclosed quarters, exposed to view: such as bedrooms, lobbies, platforms, playgrounds, large work places, yards and so forth. Thereby, it is provided personal security, time-saver, pollution-control and comfort.

BRIEF DESCRIPTION OF THE DRAWINGS

In order that the invention may be more fully understood, one construction of urinal, in accordance eith the invention, will now be described, by way of example, with reference to the accompanying drawings in which.

DESCRIPTION OF PREFERRED EMBODIMENTS

Figure 1:
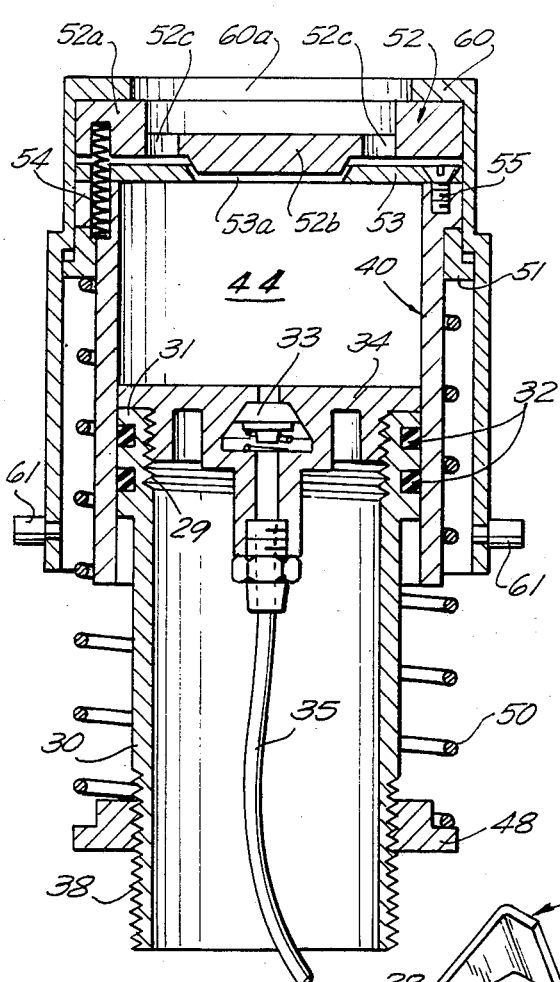
FIG. 1 is a longitudinal section of the pumping embodiment which is the major portion of the invention.

Referring now to FIG. 1, numeral 30 indicates the stationary lower sleeve member, having flange 31 with rings 32 and its upper end is closed by a heavy plate 34, carrying check valve 33. Upper movable and flanged sleeve 40 is closely slip fit on flange 31; a relatively thin and flexible plate 53, carrying a valve seat 53a is secured on top of sleeve 40 by flathead screws 55. Above the plate 53 is disposed a normally open, one-way valve 52. A big helical compression spring 50, surrounding sleeves 30 and 40 biases the latter in its upper position by pushing it up through the stepped annular big spacer 51 and a number of small springs hereinafter to be described.

A stepped bonnet 60, open at both ends, having on its skirt two gudgeons 61 linked with an actuating operator, covers upper sleeve 40, upper half of spring 50, and is resting upon valve 52.

The flange of sleeve 40 is drilled with about a dozen small vertical thru-holes. Similarly plate 53 has a dozen holes registering with those of flange sleeve 40. Furthermore spacer 51 and valve 52 have blind holes registering with the holes in the plate 53 and the flange of sleeve 40. A dozen small coiled compression springs 54 are disposed and retained in these registering holes and serve to hold up inlet valve 52, bonnet 60 and its accessories.

It should be noted that valve 52 is interposed between cover plate 53 and bonnet 60.

The novel valve 52 is the "heart of the invention". It is by means of this normally open inlet valve 52 that the pump of present invention has been discovered. Valve 52 comprises:

(a) a large and rigid peripheral heavy ring segment 52a in which are lodged the upper ends of springs 54 in blind holes;

(b) a central valve head segment 52b having a sealing face; and (c) an annular, apertured segment 52c between the heavy ring segment 52a and the valve head 52b.

This valve 52 is biased all the time ("at rest" and in operation) against bonnet 60 by means of the springs 54. It is prevented from sideways shifting because the springs 54 are extending through its blind holes, and its thrust pressure against the bonnet. Thus valve 52 acts as an integral part of bonnet 60. Hence the bonnet 60 is slip fit over sleeve 40 of pressure chamber 44, thereby valve 52 is guided in alignment to and fro its seat.

Furthermore the rigid ring 52a serves to take up and absorb the actuation impact of bonnet 60 and thereby, along with the flexibility of cover 53, protecting the valve faces of head 52b and of its seat 53a from overpressure.

A flexible discharge line 35 is plumbed one end to the bottom of check valve 33 and the other end to a disposal means (not shown) such as a toilet boel trap, a drainpipe, a nearby drain-tank or a similar receptacle.

DESCRIPTION OF OPERATION

In the operation of this device, at the intake cycle, urine is directed into the top opening 60a of bonnet 60, from where it pours through the open inlet valve 52 and passes down inside the sleeve 40 through the central opening 53a and into the interior chamber 44 by filling at any variable level. Thus the pressure chamber 44 of sleeve 40 is gravity filled through the central opening 60a, the opening 53a and the open valve 52. The liquid in the chamber 44 can be any variable level. Usually the level is between ten percent to a hundred percent full. After the filling operation the user pushes down on the reciprocating bonnet 60, preferably by his foot, through an operator (not shown). Such operator mechanisms: pedal operator, treadle operator, button, level, pilot cylinder, are well-known in the art and the description thereof is not needed in this specification. Immediately as the bonnet 60 starts its downstroke, it pushes down inlet valve 52 to its closed position and makes its bottom surface touch and press against sleeve 40. Thus the latter is in down-stroke also and the compression cycle is in process to compress the interior chamber 44.

Increasing pressure of sleeve 40 constrains check valve 33 to open, pumps the urine body into discharge line 35 which conveys it into a drain or any other receptacle. When sleeve 40 has reached the end of its downstroke, its interior chamber 44 is then evacuated. Now the user releases the operator and big spring 50 brings up everything, valve prober 52 is reopened by springs 54 and the device is ready for another use.

It is well-known in the art that the valve faces of 52b and 53a are very delicate elements and only a light "sealing pressure" can be applied on them. Their proper functioning is crucial for the pump's operativeness.

Over-pressure will impair these faces in no time. Specifically, if over-pressure is used to actuate a reciprocating member, it will result not only in premature failure but the overpressure will evidence the inoperativeness of the device.

The present invention obviates the problem of overpressure by means of its flexible plate 53 and the peripheral rigid segment 52a.

It should be noted that the actuator bonnet 60 is adopted to take in downward pouring liquid through its central opening 60a and direct it into the chamber 44, and also it is adopted to actuate the sleeve 40 of chamber 44.

For best results and long-lived device it is desirable that the segments 52a and 52b do not hit their counterparts together, at same instant. Therefor the arrangement is hence such that first segment 52b contacts its seat 53a. It pushes down its seat about two thousandths of an inch by virtue of the flexibility of plate 53, then segment 52a contacts plate 53.

It is thus apparent from the forgoing description that the device of the present invention is capable of disposing the whole body of urine of one use by means of a single depression act. Said operative depression, exercised by the user's foot or hand or otherwise, is not an exhausting physical act, but it obviates the wasteful water flush.

Also it is to be noted that pressure chamber 44 most often will be used partially filled. Thus an amount of air above the liquid level is entrapped and compressed, in turn pushing the urine into discharge line 35. When sleeve 40 stops at the end of its down-stroke, this compressed air continues to pump the urine until the up-stroke starts.

It is further to be noted that the pumping action just described obviates dependence on gravity discharge with relatively large piping which is the case of the present state-of-the-art. Furthermore this large piping is supposed to be hidden, for the most part, behind walls and beneath floors. Piping is no problem with the present invention. By virtue of its slender and flexible discharge line, and in conjunction with a proper guard means, the urinal of this invention may be installed at any desirable place besides bathrooms, restrooms and toilets. It may be installed on or nearby the sites where man is present or occupies; in any room where a man wants it. The slender and flexible piping, both discharge and supply, may be run, for example, along or under the cornice of a ceiling to connect with a drain.

Figure 2:
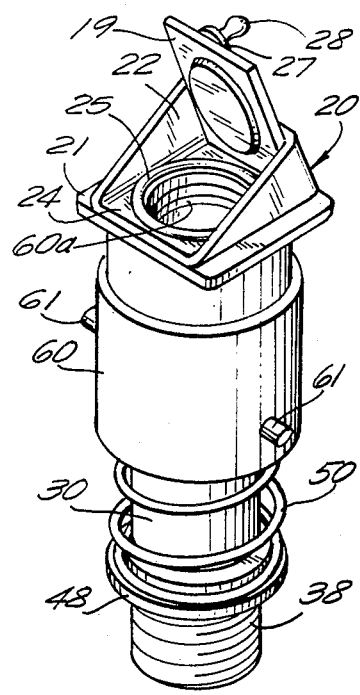
FIG. 2 is a front elevation view of same embodiment of FIG. 1, equipped with a cap in its open position.

The form of the invention illustrated in FIG. 2 is the same as FIG. 1 except that it is provided with a special sealing cap structure 20. This cap has an adapter 21 having a large inlet hole and is secured on the face of bonnet 60. A rectangular base-plate 24 with a similar large inlet hole is welded on plate 21. The periphery of this hole is grooved and fit with a seal ring 25. A rectangular lid proper 19 is hinged on plate 24, and has on its lower face a circular boss converging with seal 25.

A catch 27 and a handle serve to close lid 19 air tight. A spring (not shown) flips the lid and holds it open. Two upright flat flanks 22, fixed on plate 24, operatively side the lid 19. Flanks 22 have angled shoulders to stop lid 19 when it flips open. These shoulders are also sealant coated to prevent any leakage therefrom. The arrangement is hence such that the opening of the bonnet 60 and the large holes of adaptor 21 and plate 24 superpose and give free passage to incoming poured liquids. It is to be noted here that cap 20 changes the entrance plane of the device from horizontal to a slightly inclined plane which is more close and comfortable to the user. In its open position, its fixed flanks 22 rectangular plate 24 and lid 19 form the shape of a hopper which prevents spatter, spurt and leak. In its closed position, cap 20 complements the inlet valve 52 at the down-stroke period: any liquid going past the valve 52 by leaking will stop at cap's seal. At rest position, the cap 20 prevents smell, flies, etc.

Figure 3:
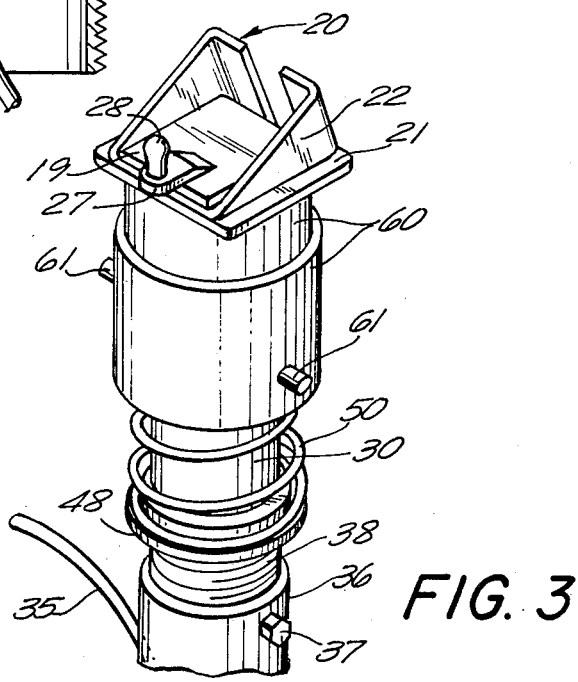
FIG. 3 is a view like FIG. 2, but showing the device further mounted on a pedestal, the cap in its closed position, and the device in its lower point of downstroke.

FIG. 3 is the same embodiment of FIGS. 1 and 2, but showing the device mounted on the pedestal 36 which in turn is supported by a flange mounted on the floor (not shown). The skirt of sleeve 30 is snug-fit in pedestal 36 and secured by a fulcum bolt 37. Cap 20 is shown in its closed position and the device in its bottom point of down-stroke.

Figure 4:
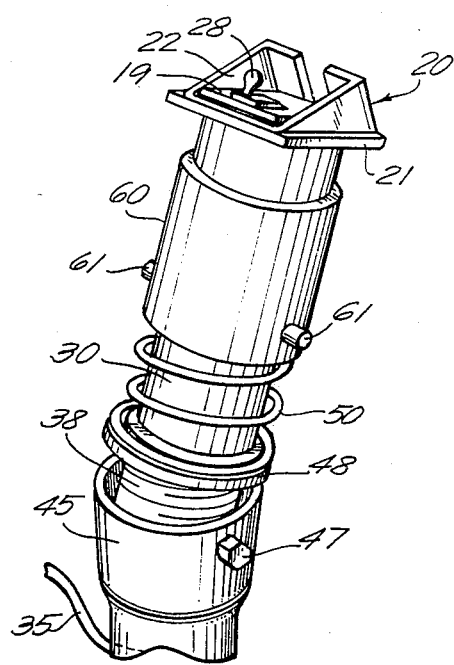
FIG. 4 is a side elevational view like FIG. 3, but showing the device in its "at rest" position and swung about its fulcral rod, to be out of one's way.

FIG. 4 is a modification of FIG. 3. Here the pedestal 46 has a bell-mouthed female end 45 which is cut and arranged to permit the urinal to swing about its fulcral rod 47. The swing is allowed only to one side in order to put the device out of one's way when not in use.

Figure 5:
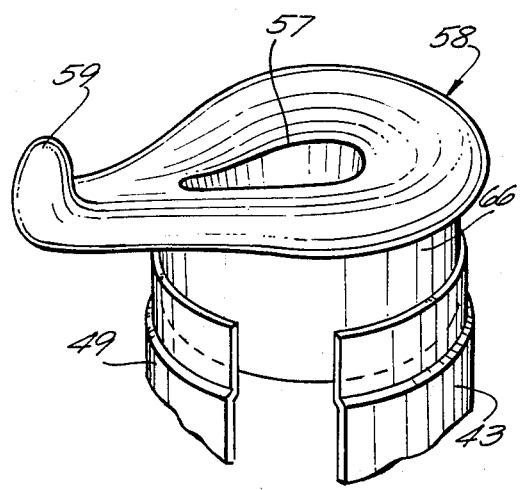
FIGS. 5 and 6 are views of a modification of the invention equipped with a saddlelike seat specifically for female use.
Figure 6:
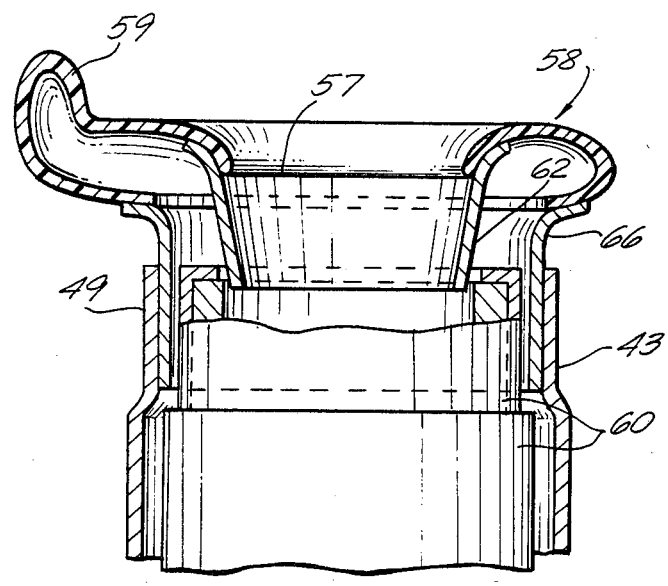

FIG. 5 is a view of another modification of the invention equipped with a new saddlelike seat structure 58 specifically for female use.

This relatively small seat 58 has a modified pommel 59, to guide, and help position herself on the seat, and an elongate aperture 57. Affixed to the underside of seat 58 is the elastic coupling 62, oval-shaped at the top portion and contracting down to funnel-shaped. This covers the area of aperture 57 and connects it hermetically with the opening 60a of bonnet 60. Concentric with the lower end of coupling 62, is affixed beneath the seat a larger and rigid collar 66 which flares down and loosely encircles the stepped portion of bonnet 60. A semicircular leg 43, bearing upon the face of flange 38, firmly clamped on pedestal 36, is fastened on the outer face of collar 66 to support seat 58. A similar but narrow leg 49 is similarly arranged in opposite side of leg 43, supports the pommel side of the seat.

In the operation of this form, the urine passing down through aperture 57 is funneled by coupling 62 into open valve 52 and filled inside chamber 44. When bonnet 60 is depressed, seat 58 and its connected parts 62, 66, 43, and 49 stay fixed in their respective positions. On the upstroke, the inner face of collar 66 guides the device to engage and seal with coupling 62.

The rest of the operation is the same as described above.

The invention having been described, what is claimed is:

1. A pouring liquid pumping device open to the outside atmosphere, connected to a discharge means, having an "at rest" position, an intake cycle and a compression cycle; the device being operable during the compression cycle for pumping the poured liquid; said device comprising:
   pressure chamber means having a pressure chamber and a cover plate with a central opening open to the outside atmosphere during the "at rest" position;
   actuating means for depressing the cover plate and the pressure chamber downwardly during the compression cycle, said actuating means also having a central intake opening for accepting poured liquid from the outside of the device;
   a normally open inlet valve interposed between said pressure chamber and said actuating means and being also open to the outside atmosphere during the "at rest" position;
   said normally open inlet valve having a rigid peripheral segment constantly urged under said actuating means;
   said inlet valve further having a central valve head segment comprising a sealing face and an apertured segment connecting said peripheral segment and said valve head segment; and
   said pressure chamber being adapted to be liquid filled from the exterior of the device by gravity, through the central opening of its cover plate, during the intake cycle and adapted to pump substantially all the pour-in liquid, through the discharge means, in one operative compression cycle.

2. A device of claim 1, wherein said actuating means comprises an actuator stepped bonnet member slip-fit about said pressure chamber, having a central intake opening directly open to the atmosphere at all times, accepting downward pouring liquid from the exterior of said device and directing the liquid into said pressure chamber through said normally open valve and said cover plate;
   a spring means operatively biasing said actuator bonnet member, said pressure chamber, and said inlet valve during the "at rest" position; then at the compression cycle said actuator bonnet operatively depressing said spring means, and said pressure chamber thereby closing the inlet valve and compressing the interior of said pressure chamber and pumping all the liquid through the discharge means.

3. A device of claim 2, wherein said discharge means comprises:
   a check valve, a receptacle and
   a flexible discharge line means connected to said check valve for conveying the liquid to the receptacle.

4. A device of claim 3, wherein said spring means further comprises a plurality of springs interposed between the rigid peripheral segment of said inlet valve and said pressure chamber in order for biasing peripherally and continuously said inlet valve in parallel position to the cover plate and thereby aligning the inlet valve during the compression cycle.

5. A device of claim 4, wherein said cover plate having a valve seat with a face fitted to the sealing face of said valve head;
   said cover plate being made flexible,
   said cover plate and said peripheral segment being arranged and constructed to protect said fitted valve faces from over-pressure.

6. The combination of claim 5, further including a pedestal operatively supporting said pumping device.

7. The device of claim 6, wherein said pedestal comprises:
   a fulcral rod,
   a bell-mouthed female end pivotally supporting said pumping device; and,
   wherein said device comprises a sleeve skirt loosely fitted into said female end operably permitting said pumping device to swing about the fulcral rod out of one's way when not in use.

8. A pouring liquid pumping device, open to the outside atmosphere, and connected to a discharge means, having an "at rest" position, an intake cycle and a compression cycle, comprising:
   an upright stationary lower sleeve member having a flanged upper end, a lower cover over said flanged end, a check valve beneath the cover, adapted to be connected to said discharge means; said flanged end having piston rings and acting as a stationary piston;
   an upper sleeve member operatively disposed about said flanged end of the lower sleeve member, having an interior pressure chamber and also having a flanged upper end, an upper cover over said flanged end with an inlet opening in form of valve seat;

actuating means comprising an actuator bonnet having a liquid intake opening and being operatively reciprocating said upper sleeve member;

a spring-loaded, normally open, inlet valve interposed between said upper sleeve cover and the actuator bonnet;

said inlet valve, being open to the outside atmosphere, having a rigid peripheral segment taking the actuation impact of said bonnet imparted to said upper sleeve cover, a central sealing valve head operably fitting said valve seat of the upper sleeve cover; and said inlet valve further comprising:

an intermediate apertured segment providing, along with said bonnet intake opening, a pouring liquid passageway from the outside atmosphere into said pressure chamber of the upper sleeve member during the intake cycle.

9. A device of claim 8, wherein said actuator bonnet having at least one link means operatively connecting with said actuating means.

* * * * *